United States Patent
Sayed et al.

(10) Patent No.: US 11,840,666 B1
(45) Date of Patent: Dec. 12, 2023

(54) METHOD TO ATTENUATE ACID REACTIVITY OF SUBTERRANEAN FORMATIONS WITH OMNIPHOBIC CHEMICALS

(71) Applicant: ARAMCO SERVICES COMPANY, Houston, TX (US)

(72) Inventors: Mohammed Sayed, Katy, TX (US); Rajesh Saini, Cypress, TX (US); Fakuen Frank Chang, Houston, TX (US); Amy J. Cairns, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/816,795

(22) Filed: Aug. 2, 2022

(51) Int. Cl.
- *C09K 8/74* (2006.01)
- *E21B 43/27* (2006.01)
- *C09K 8/60* (2006.01)
- *C09K 8/72* (2006.01)

(52) U.S. Cl.
CPC ................ *C09K 8/74* (2013.01); *C09K 8/604* (2013.01); *C09K 8/725* (2013.01); *E21B 43/27* (2020.05)

(58) Field of Classification Search
CPC .......... C09K 8/74; C09K 8/604; C09K 8/725; E21B 43/27
See application file for complete search history.

(56) References Cited

U.S. PATENT DOCUMENTS

| | | | |
|---|---|---|---|
| 5,082,056 A | 1/1992 | Tackett, Jr. | |
| 7,299,874 B2 | 11/2007 | Welton et al. | |
| 10,047,272 B2* | 8/2018 | Gamage | E21B 43/16 |
| 11,578,263 B2* | 2/2023 | Haque | C09K 8/805 |
| 2005/0197257 A1 | 9/2005 | Bouwmeester | |
| 2008/0314594 A1* | 12/2008 | Still | C09K 8/72 |
| | | | 166/307 |
| 2011/0092394 A1 | 4/2011 | Peng et al. | |
| 2011/0092395 A1 | 4/2011 | Peng et al. | |
| 2013/0264061 A1* | 10/2013 | Baran, Jr. | E21B 43/26 |
| | | | 166/305.1 |

(Continued)

FOREIGN PATENT DOCUMENTS

| | | |
|---|---|---|
| CN | 101691839 A | 4/2010 |
| CN | 103059830 A | 4/2013 |

(Continued)

OTHER PUBLICATIONS

Thomas et al., "Adsorption of organic compounds on carbonate minerals: 1. Model compounds and their influence on mineral wettability," J.M. Chemical Geology, 1993, 109, 201, 13 pages.

(Continued)

*Primary Examiner* — Silvana C Runyan
(74) *Attorney, Agent, or Firm* — Osha Bergman Watanabe & Burton LLP

(57) ABSTRACT

A formation treatment composition that includes an aqueous fluid, at least omniphobic fluorochemical, and an acid is described. A method of attenuating acid reactivity of a formation rock is also described. The method includes injecting a formation treatment composition into a reservoir, contacting the omniphobic fluorochemical of the formation treatment composition with the rock, and mitigating a reaction between the acid of the formation treatment composition and the rock surface.

15 Claims, 2 Drawing Sheets

(56) References Cited

U.S. PATENT DOCUMENTS

2015/0080271 A1    3/2015   De Wolf et al.
2015/0083417 A1*   3/2015   Lant .................. E21B 43/27
                                                                    166/279

FOREIGN PATENT DOCUMENTS

| EP | 0278540 B1 | 8/1992 | |
|----|------------|--------|----|
| GB | 2163790 A | 3/1986 | |
| WO | WO-2013116227 A1 * | 8/2013 | ............. C04B 28/02 |
| WO | 2015154977 A1 | 10/2015 | |

OTHER PUBLICATIONS

Frye et al., "Adsorption of organic compounds on carbonate minerals 2. Extraction of carboxylic acids from recent and ancient carbonates," Chemical Geology, 1993, 109, 215, 12 pages.

Thomas et al., "Adsorption of organic compounds on carbonate minerals. 3. Influence on dissolution rates," Chemical Geology, 1993, 109, 227, 11 pages.

Bai et al., "Atomistic Molecular Dynamics Simulations of Surfactant Induced Wettability Alteration in Crevices of Calcite Nanopores,"Energy Fuels 2020, 34, 3135, 33 pages.

Sayed et al., "Nano-Texturing of Hydrocarbon Reservoirs with Omniphobic Nanoparticles to Mitigate Liquid Phase Trapping," SPE International Conference on Oilfield Chemistry 2021: SPE-204289-MS, 22 pages.

Ahmadi et al., "Nano-texturing of Hydrocarbon Reservoirs With Omniphobic Nanoparticles to Mitigate Liquid Phase Trapping," SPE Prod & Oper 26 (1): 67-74. SPE-133591-PA, Feb. 2011, 8 pages.

Fahimpour et al., "Optimization of Fluorinated Wettability Modifiers for Gas/Condensate Carbonate Reservoirs," Presented at the SPE EUROPEC/EAGE Annual Conference, Copenhagen, Denmark, Jun. 4-7, 2012. SPE-154522 MS, 15 pages.

Fahimpour et al., "A Combined Experimental and Theoretical Investigation on Application of Wettability Modifiers in Gas/Condensate Reservoirs." Presented at the SPE Annual Technical Conference and Exhibition, San Antonio, Texas, USA, Oct. 8-10, 2012. SPE-159807-MS, 15 pages.

Li et al., "Experimental Study of Wettability Alteration to Preferential Gas Wetting in Porous Media and Its Effects," SPE Res Eval & Eng 3 (2): 139-149. SPE-62515-PA, Apr. 2000,11 pages.

Torres et al., "A Novel Chemical Treatment to Enhance Productivity of Volatile Oil Wells," Presented at the Canadian Unconventional Resources and International Petroleum Conference, Calgary, Oct. 19-21, 2010. SPE-138124-MS, 10 pages.

He et al., "Brine-Soluable Zwitterionic Copolymers with Tunable Adsorption on Rocks," ACS Appl. Mater. Interfaces 2020, 12, 13568, 7 pages.

* cited by examiner

METHOD TO ATTENUATE ACID REACTIVITY OF SUBTERRANEAN FORMATIONS WITH OMNIPHOBIC CHEMICALS

BACKGROUND

In order to increase hydrocarbon production in carbonate formations, treatments are often performed with acids, such as inorganic acids and organic acids. These acids may be selected based on their reactivity with the carbonate formations of rock matrix. Matrix stimulation treatments may be performed by injecting these acids through wellbores to react with and dissolve parts of the carbonate formations. In successful treatments, the dissolution process results in the formation of highly conductive channel networks, thereby enhancing hydrocarbon production. Such acid stimulation may be carried out in carbonate formations (e.g., calcite, dolomite, and the like) using strong mineral acids. For example, hydrochloric acid (HCl) may be chosen for its low cost and effectiveness in dissolving calcium and magnesium carbonates. Moreover, the reaction products resulting from the dissolution are readily soluble in water, which may be advantageous in preventing damage of the formation.

However, HCl may react intensely with calcite-rich rock matrices, particularly at elevated temperatures, resulting in significant operational limitations in terms of performance or cost. For example, when HCl is used in high concentrations, it may react rapidly with the rock matrix before deep penetration into the rock matrix can be achieved. This will pose the need for larger volumes of acid to be used to efficiently stimulate the zone. Other limitations may include various safety concerns associated with the transfer and handling of highly corrosive acids at the well site. As well, undesired acid reactions occurring near the wellbore may cause corrosion and damage to drilling equipment, metal tubulars, and casing, resulting in safety issues for operators. Additionally, corrosion inhibitors may be needed for the acid treatment, increasing the cost and complexity of operations. Corrosion inhibitors may also lead to formation damage which, if not addressed, may reduce permeability in the reservoir thereby limiting hydrocarbon production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a formation treatment composition that includes an aqueous fluid, at least omniphobic fluorochemical, and an acid.

In another aspect, embodiments disclosed herein relate to a method of attenuating acid reactivity of a formation rock. The method includes injecting a formation treatment composition into a reservoir. The formation treatment composition includes a solution of a fluid that includes at least one omniphobic fluorochemical and an acid. The method also includes contacting the omniphobic fluorochemical of the formation treatment composition with the rock, thereby creating an omniphobic fluorochemical barrier on a surface of the formation rock, and mitigating a reaction between the acid of the formation treatment composition and the rock surface, thereby attenuating a reaction between the rock and the acid.

In another aspect, embodiments disclosed herein relate to a method of attenuating acid reactivity of a formation rock, where the method includes injecting a pre-flush fluid into a reservoir. The pre-flush fluid includes a solution including an omniphobic fluorochemical. The method also includes contacting the omniphobic fluorochemical of the pre-flush fluid with a rock surface of the formation, thereby creating an omniphobic fluorochemical barrier on the rock surface with the omniphobic fluorochemical of the pre-flush fluid, injecting an acidic fluid into the reservoir, where the acidic fluid comprises an acid in an aqueous fluid, and mitigating a reaction between the acid of the acidic fluid and the rock surface, thereby attenuating a reaction between the rock and the acid.

Other aspects and advantages of the claimed subject matter will be apparent from the following description and the appended claims.

DETAILED DESCRIPTION

Figure 1:
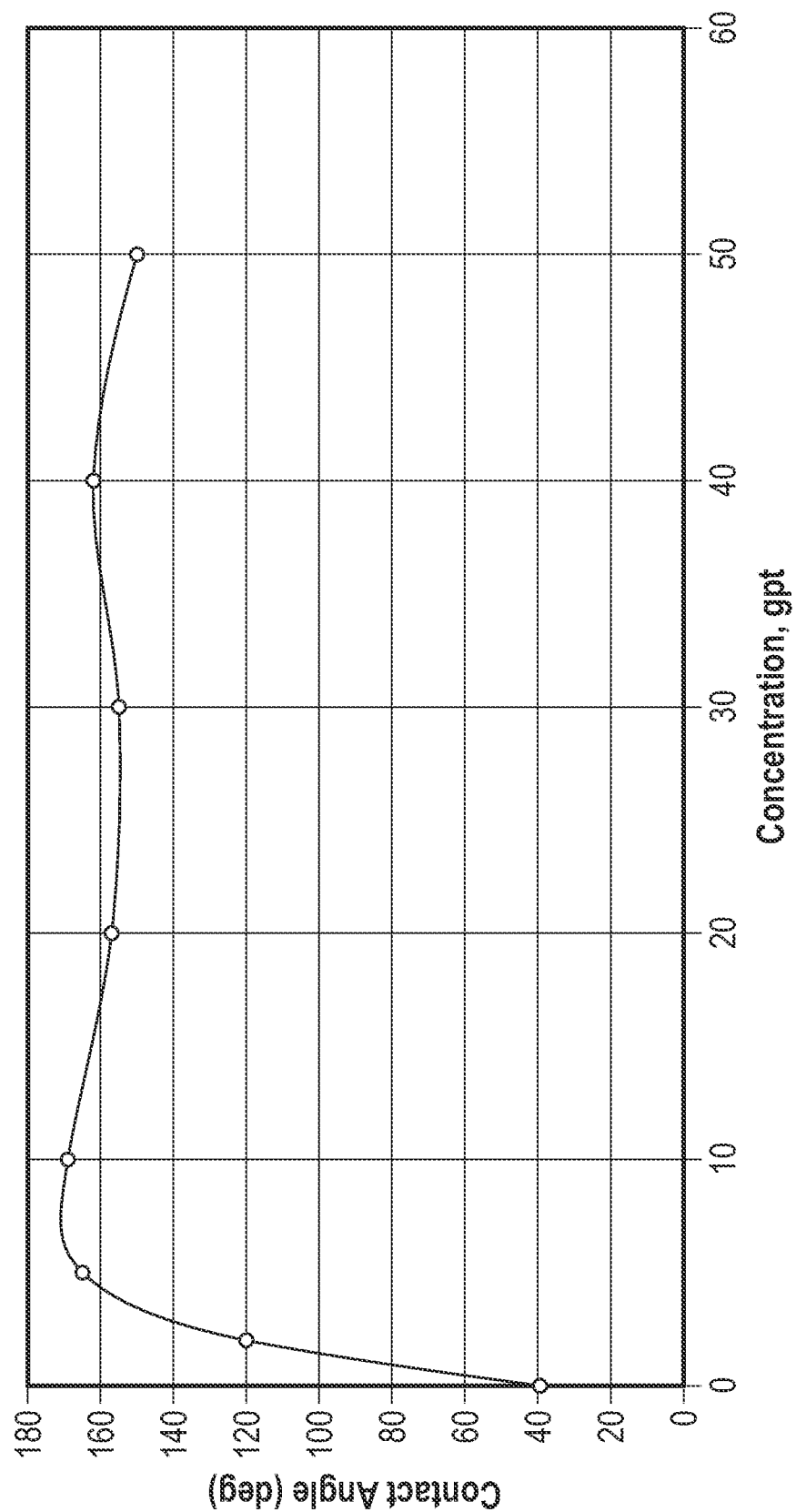
FIG. 1 is a graph demonstrating results obtained for water contact angle measurements at varying concentrations in accordance with one or more embodiments.

Several strategies have been employed for retarding the reaction rate between an acid and a rock matrix. For example, the acid may be encapsulated or emulsified to form a temporary barrier between the acid and the rock matrix. The temporary barrier may be formed by a polymer-type shell or coating, an acid-in-diesel (a water-in-oil) emulsion, foaming of the acid, or gelled systems. When the acid is encapsulated or emulsified, stimuli changes, such as temperature, pressure, pH, or shear, may be used to trigger the release of the acid. Alternative strategies have included the use of organic acids, chelants, or retarding agents. However, limitations still exist, such as the high friction pressures resulting from pumping of emulsified acid systems and increased operational complexity in fluid preparation. The solubility of the resultant products of organic acids with the matrix material may also be limited. The reaction rate between the acid and the rock matrix may also be attenuated by an acid retarding agent containing a salt which has the potential to slow down proton diffusion from the bulk acid to the rock surface.

There exists a need for improved matrix acid stimulation and acid fracturing of carbonate rich reservoirs to achieve a deeper penetration of acid and to minimize the amount of acid used. Accordingly, improvements are needed, for instance to achieve deeper penetration of acid into a reservoir, or to minimize the amount of acid used, or both. This invention provides a method for controlling and reducing the reaction rate between hydrochloric acid (HCl) and the carbonate rock matrix through the addition of at least one omniphobic fluorinated compound that may be zwitterionic, anionic, cationic or neutral in nature.

One or more embodiments of the present disclosure relate to a formation treatment composition for retarding the reaction rate between an acid (e.g. HCl) and carbonate formations of the rock matrix, carbonate reservoirs, and/or carbonate-based damaged areas of sandstone reservoirs. In one or more embodiments, the formation treatment composition may include an omniphobic compound and an acid.

The omniphobic compound may be a fluorinated compound, such as a fluorinated surfactant, a fluorinated polymer, or combinations thereof. The term "omniphobic compound" used throughout the specification refers to a compound that repels any liquid, such as hydrocarbon solvents and aqueous solutions.

Fluorochemicals, e.g., fluoropolymers, fluorinated surfactants, and fluorinated polymeric surfactants, have good thermal, chemical, photochemical, hydrolytic, oxidative, and biological stability. This stability is due to the strength of the carbon-fluorine bond, one of the strongest in organic chemistry. The strength of the carbon-fluorine bond is a result of the electronegativity of fluorine atom, which imparts partial ionic character of the carbon and fluorine atoms, and therefore, shortens the carbon-fluorine bond length and strengthens the bond through favorable covalent interactions.

Additionally, multiple carbon-fluorine bonds increase the strength and stability of other nearby carbon-fluorine bonds on the same geminal carbon, as the carbon atom has an increased partial positive charge. Furthermore, multiple carbon-fluorine bonds also strengthen the "skeletal" carbon-carbon bonds from the inductive effect. Therefore, saturated fluorocarbons are more chemically and thermally stable than their corresponding hydrocarbon counterparts, and indeed any other organic compound. Fluorochemicals, and in particular fluoropolymers, are used in a great variety of applications due to excellent physicochemical properties such as chemical and thermal stability, hydrophobicity, omniphobicity, low surface energy, and environmental resistance.

Formation Treatment Composition

The formation treatment composition of one or more embodiments may include an solvent, a fluorochemical, and an acid.

The fluorochemical may be an omniphobic fluorochemical. In some embodiments, the omniphobic fluorochemical may be nonionic, zwitterionic, anionic, or cationic. The omniphobic fluorochemical may be selected from the group consisting of a nonionic acrylic fluorinated copolymer, a nonionic fluorinated surfactant, partially fluorinated acrylic copolymer, a nonionic fluorinated methacrylate polymer, an anionic phosphate fluorinated surfactant, an anionic sulfate fluorinated surfactant, and combinations thereof.

In one or more particular embodiments, the omniphobic fluorochemical may be water-soluble. The omniphobic fluorochemical of one or more embodiments can be linear, branched chain, dendritic molecules, or polymer brushes. The term "polymer brushes" may be defined as dense layers of polymer chains grafted to a primary polymer chain, where the distance between grafts is less than the dimensions of the bound polymer. Dendritic molecules include molecules with high symmetry surrounding a core structure and usually exhibit a radial shape. The omniphobic fluorochemicals can include alkyl, aryl or substituted alky and aryl derivatives.

In such embodiments, the omniphobic fluorochemical may include a hydrophilic head-group and a hydrophobic tail. The hydrophilic head group has a chemical affinity/retention towards the rock surface. The hydrophobic tail may include a long chain of alkyl groups. One or more of the alkyl groups are fluorinated. The fluorinated alkyl groups may repel water or aqueous solutions, such as acidic solutions, as well as oleic phases, such as condensate or crude oil, from the rock surface thus creating a temporary barrier to delay acid reactivity.

Notably, the functionality of the omniphobic fluorochemical can be tailored to increase adsorption and retention to the rock surface in addition to degree of repellency to best meet the application needs. In some embodiments, the omniphobic fluorochemical may be functionalized to promote stronger interaction with the rock matrix, for example, by introducing a greater number of hydrophilic moieties on the omniphobic fluorochemical molecule or by introducing functional moieties that will impart ionic, covalent, non-covalent interactions, or combinations thereof with neighboring surfactant molecules adsorbed on the formation surface (for example, a greater number of carbon-fluorine bonds, pi-pi stacking, and hydrogen bonding). The resulting more compact stacking of neighboring surfactant molecules on the formation surface may provide a more effective barrier to water and aqueous solutions containing acid, enhancing the attenuation effect.

General formulas of omniphobic fluorochemicals in accordance with the present disclosure are represented by Formula (I) and Formula (II), described below.

$$R_f\text{—}SO_2N^-\text{—}R_x \cdot M^+ \quad \text{Formula (1)}$$

where $R_f$ is a $C_1$ to $C_{12}$ perfluoroalkyl group, $R_x$ is hydrogen, an alkyl group, a hydroxyalkyl group, an alkylamine oxide, an alkylcarboxylate group or an aminoalkyl group, and $M^+$ is a cation. The cation $M^+$ may be selected from the group consisting of ammonium, phosphonium, alkali metal cations, such as lithium, potassium, or sodium, other metal cations, and combinations thereof. The fluoro-containing pendant group ($R_f$) can be bonded to a primary, secondary or tertiary carbon.

$$R_f\text{-}Q\text{-}R_y\text{—}SO_3^-\cdot M^+ \quad \text{Formula (II)}$$

where $R_f$ is as described above with regard to Formula (I), $R_y$ is an alkylene of the formula $-C_nH_{2n}(CHOH)_o C_mH_{2m}-$, where n and m are independently 1 to 6, and o is 0 or 1, and $M^+$ is a cation. The cation $M^+$ is as described above with regard to Formula (I). Q is $-O-$, or $-SO_2NR_2-$, where $R_2$ is an $H-$, an alkyl, an aryl, a hydroxyalkyl, a aminoalkyl, or a sulfonatoalkyl group.

In one or more particular embodiments, Formula (I) may be a compound having the structure as shown in Formula (III). As mentioned above, the cation $M^+$ may be a sodium cation, a potassium cation, an ammonium cation, or a phosphonium cation.

Formula (III)

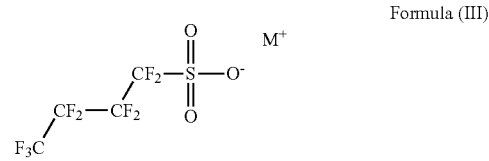

Embodiments in which the fluorochemical has a general structure as shown in Formula (II), the fluorochemical may be as shown as Formula (III).

In one or more embodiments, the fluorochemical may be nonionic. The fluorochemical may be a nonionic acrylic fluorinated copolymer, a nonionic fluorinated surfactant, partially fluorinated acrylic copolymer, or a nonionic fluorinated methacrylate polymer. In one or more particular embodiments, the fluorochemical may have a structure selected from the group consisting of Formulas (IV) to (VI).

Formula (IV)

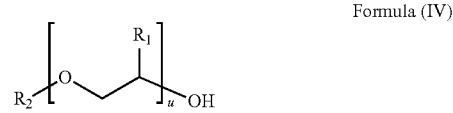

Formula (V)

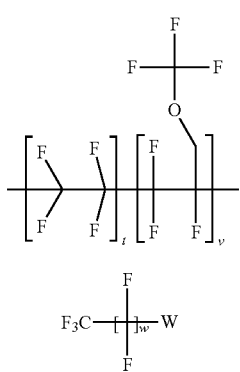

Formula (VI)

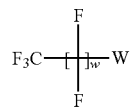

Formula (VII)

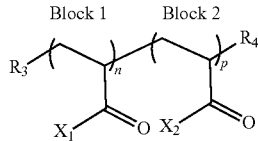

where s, u, t, v, and w are independently between 5 and 150. As shown in Formula (IV), $R_2$ is a $C_1$ to $C_{12}$ perfluoroalkyl group, and $R_1$ is hydrogen, an alkyl group, a hydroxyalkyl group, an alkylamine oxide, an alkylcarboxylate group or an aminoalkyl group. As shown in Formula (VI), X is a neutral end group, such as a hydroxy group or a sulfonamide.

Non-limiting examples of Formula IV include alkanamide, perfluoro-N-(14-hydroxy-3,6,9,12-tetra oxatetradec-1-yl) and poly(oxy-1,2-ethanediyl), α-(perfluoro-1,4,7,10-tetramethyl-13-oxo3,6,9,12-tetraoxaeicos-1-yl)-ω-hydroxy. A non-limiting example of Formula V includes a copolymer of tetrafluoroethylene and trifluoro methane vinyl ether. Non-limiting examples of Formula VI include (per)fluorinated organic surfactants, such as perfluorooctane sulfonic acid (1-Octanesulfonic acid, heptadecafluoro-, 3M), perfluorooctane sulfonate lithium, perfluorooctane sulfonate potassium, perfluorooctane sulfonate ammonium, perfluorooctanoic acid (perfluoroheptanecarboxylic acid, available from 3M), and polymers that may include perfluorooctane sulfonic acid and/or salts derived thereof.

Examples of commercially available fluorochemicals in accordance with the present disclosure include, but are not limited to, NW100® Fluorinated Surfactant in water (Verdechem, Canada), WS1200® (3M, Minnesota), Zonyl® UR (Chemours, Delaware), Zonyl® TBS (Chemours, Delaware), Dynasylan® F 8815 (Evonik Industries, New Jersey), Dynasylan® F 8263 (Evonik Industries, New Jersey), and Dynasylan® F 9896 (Evonik Industries, New Jersey) may be included in the formation treatment composition.\

In one or more particular embodiments, the omniphobic fluorochemical may be a fluorinated amphiphilic block copolymer having two blocks. The fluorinated amphiphilic block copolymer may have a first block bearing the head moiety that adsorbs onto the formation surface and a second block bearing the fluorinated tail moiety that repels the acid-containing aqueous phase from the formation surface, providing a temporary barrier between the acid and the carbonate rock matrix. The first block is hydrophilic with preferential affinity toward the formation surface and may be anionic, cationic, or polar uncharged. The second block may be a hydrophobic block with fluorinated groups.

In one or more embodiments, an omniphobic block copolymer may be a compound represented by Formula (VII), including a first block (i.e. Block 1) and a second block (i.e. Block 2). In some embodiments, the amphiphilic block copolymer may have more than two blocks.

where n and p independently selected and range from 5 to 150. In some embodiments, $R_3$, $R_4$, $X_1$, and $X_2$ may independently be a halogen, hydrogen, cyano group, straight or branched alkyl of $C_1$-$C_{20}$, straight or branched perfluoroalkyl of $C_1$-$C_{20}$, α, β-unsaturated straight or branched alkenyl or alkynyl of $C_2$-$C_{10}$, α, β-unsaturated straight or branched alkenyl of $C_2$-$C_6$ substituted with a halogen, $C_3$-$C_8$ cycloalkyl, heterocyclyl C(=Y)$R_5$, C(=Y)NR$_6$R$_7$, or YC(=Y)$R_8$ (where Y may be NR$_8$ or O and $R_5$ is alkyl of $C_1$-$C_{20}$, alkoxy of $C_1$-$C_{20}$, aryloxy or heterocyclyloxy; $R_6$ and $R_7$ are independently H or alkyl of $C_1$-$C_{20}$, or $R_6$ and $R_7$ may be joined together to form an alkylene group of $C_2$-$C_5$, thus forming a 3- to 6-membered ring; and $R_8$ is H, straight or branched $C_1$-$C_{20}$ alkyl or aryl). In some embodiments, $X_1$ and $X_2$ may independently be hydrogen, hydroxy, or an alkoxy group.

Block one may be derived from a first monomer, and block two may be derived from a second monomer. In one or more particular embodiments, the first monomer, the second monomer, or both may contain at least one fluorinated alkyl group. The first monomer may be acrylic acid, 2-acrylamido-2-methylpropanesulfonic acid, 2-hydroxyethyl acrylate, acrylamide, N,N'-dimethylacrylamide, and 2-(dimethylamino)ethyl methacrylate.

In one or more embodiments, the first monomer may be an anionic or a cationic monomer. In such embodiments, the first monomer may be derived from methacrylate or methacrylamide monomers with carboxylic acid or carboxyl groups, for example, acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, and monoethylenically unsaturated $C_4$-$C_{10}$ (preferably $C_4$ to $C_6$) dicarboxylic acid monoesters (e.g., monomethyl maleate). In some embodiments, the first monomer may be derived from methacrylate or methacrylamide monomers with phosphate, phosphonate, or phosphonite groups in free acid form or in saline form, for example, 2-acrylamido-ethylphosphonic acid (AEPA), monoacryloyloxyethyl phosphate, bis(2-methacryloyloxyethyl) phosphate, vinylphosphonic acid, allylphosphonic acid, isopropylphosphonic acid, diallyl aminomethylene phosphonate, and salts of above acids.

In some embodiments, the first monomer may be derived from a monomer with sulfonic acid or sulfonate groups, for example, 3-sulfopropyl methacrylate, 2-propene-1-sulfonic acid, sodium 1-allyloxy-2 hydroxypropyl sulfonate (COPS 1), 2-acrylamido-2-methylpropanesulfonic acid (AMPS), methallyl sulfonate, sodium vinylsulfonate, and sodium styrenesulfonate. In some embodiments, the first monomer may be derived from methacrylate or methacrylamide monomers with ammonium groups, for example, N,N'-dimethylaminomethyl meth acrylate, N,N'-dimethylaminoethyl methacrylate, N,N'-diethylaminoethyl methacrylate, N,N'-dimethylaminopropyl methacrylate, N,N'-diethylaminopropyl methacrylate, N,N'-dimethylaminocyclohexyl methacrylate, N-[2-(dimethylamino) ethyl] methacrylamide, N-[3-(dimethylamino) propyl] methacrylamide, N-[4-(dimethylamino) butyl] methacrylamide, N-[2-(diethylamino) ethyl]

methacrylamide, and N-[4-(dimethylamino) cyclohexyl] methacrylamide, and [2-(methacryloyloxy) ethyl] trimethylammonium chloride.

In some embodiments, the first monomer may be zwitterionic, for example, N-(3-sulfopropyl)-N-methacroyloxyethyl-N,N'-dimethylammonium betaine, N-(3-sulfopropyl)-N-methacroylamidepropyl-N,N'-dimethylammonium betaine, N-(3-carboxymethyl)-N-methacroylamidepropyl-N,N'-dimethylammonium betaine, and N-carboxymethyl-N-methacroyloxyethyl-N,N'-dimethylammonium betaine.

The first monomer may be derived from polar uncharged monomers. In some embodiments, the first monomer may be derived from methacrylate or methacrylamide monomers with $C_2$-$C_{30}$ alkane diols or polyethylene glycol, for example, 2-hydroxyethyl methacrylate, 2-hydroxypropyl methacrylate, 3-hydroxypropyl methacrylate, 3-hydroxybutyl methacrylate, 4-hydroxybutyl methacrylate, 6-hydroxy hexyl methacrylate, 3-hydroxy-2-ethylhexyl methacrylate, 2-hydroxy-3-phenoxypropyl methacrylate, N-(hydroxymethyl) acrylamide, N-(2-hydroxypropyl) methacrylamide, N-hydroxyethylacrylamide, N-[tris (hydroxymethyl) methacrylamide, glycerol acrylate, glycerol monomethacrylate, 4-vinylphenylboronic acid, and vinyl boronic acid pinacol ester. In some embodiments, the first monomer may be derived from acrylamide monomers, for example, N,N'-(dimethyl acrylamide) (DMA), morpholine N-oxide acrylamide, diacetone acrylamide, N,N'-dimethyl methacrylamide, N,N'-diethylacrylamide, N-isopropyl methacrylamide, N-tert-butyl methacrylamide, and diacetone acrylamide. In some embodiments, the first monomer may be derived from other hydrophilic monomers, for example, 4-acryloylmorpholine, 2-N-morpholinoethyl methacrylate, methacrylate of polyethylene glycol, methacrylate of diethylene glycol, ethylene glycol methyl ether methacrylate, poly (propylene glycol) acrylate, 2-chloroethyl methacrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam.

As mentioned above, Block 2 may be derived from a second monomer. The second monomer may include one or more of fluorinated monomers of methyl acrylate, tert-butyl acrylate, butyl acrylate, 2-ethylhexyl acrylate, dodecyl acrylate, stearyl acrylate, and styrene. In some embodiments, the second monomer may be a hydrophobic fluorinated alkyl methacrylate monomer, fluorinated $C_2$-$C_{40}$ alkyl esters of acrylic acid, fluorinated $C_1$-$C_{40}$ alkyl esters of methacrylic acid, and fluorinated vinyl aromatics. In some embodiments, the second monomer may be alkyl methacrylate monomers with fluorinated $C_1$-$C_{20}$ alkyl chains, fluorinated $C_2$-$C_{40}$-alkyl esters of acrylic acid, fluorinated $C_1$-$C_{40}$ alkyl esters of methacrylic acid. In some embodiments, the second monomer may include one or more fluorinated monomers of methyl methacrylate, ethyl methacrylate, N-propyl methacrylate, isopropyl methacrylate, N-butyl methacrylate, isobutyl methacrylate, tert-butyl methacrylate, pentyl methacrylate, N-hexyl methacrylate, N-heptyl methacrylate, N-octyl methacrylate, 2-ethylhexyl methacrylate, decyl methacrylate, lauryl methacrylate, palmityl methacrylate, stearyl methacrylate, hydrenol methacrylate, behenyl methacrylate, polyisobutene methacrylate, phenoxyethyl methacrylate, phenyl methacrylate, benzyl methacrylate, vinyl aromatic monomers (e.g., styrene), N-vinylcarbazole, 2-vinylpyridine, 4-vinylpyridine, 2-vinylpyrazine, 1-vinylimidazole, 4-acetoxystyrene, 4-bromostyrene, 2,4-dimethylstyrene, 2,5-dimethylstyrene, 3,5-dimethylstyrene, 4-ethoxystyrene, 4-tert-butylstyrene, 2-chlorostyrene, 3-chlorostyrene, 4-chlorostyrene, 4-ethoxystyrene, 4-fluorostyrene, 2,6-dichlorostyrene, 4-methoxystyrene, methylstyrene, 3-methylstyrene, 4-methylstyrene, 2,4,6-trimethylstyrene, and acrylate or methacrylate monomers with fluorinated functionality.

As noted above, the formation treatment in accordance with one or more embodiments includes a fluorochemical as described above, an aqueous solvent and an acid. The fluorochemical may be present in the formation treatment composition at a concentration of less than 100 gpt (gallons per 1000 gallons). In particular embodiments, the fluorochemical may be present in the treatment composition in an amount having a lower limit of one of 0.1 wt % (weight percent), 0.5 wt %, 1.0 wt %, 2.5 wt %, 5 wt %, and 7.5 wt % and an upper limit of one of 2.5 wt %, 5 wt %, 7.5 wt %, 8 wt %, 9 wt %, 9.5 wt %, and 10 wt %, where any lower limit may be paired with any mathematically compatible upper limit. In some embodiments, the formation treatment composition of the present disclosure may incorporate an acid in an aqueous solution. In some embodiments, the omniphobic fluorochemical may be combined with suitable inorganic or organic acids or acid-producing systems as a means of tailoring the acid reactivity with the rock matrix.

The aqueous solution of one or more embodiments includes water. The water may be distilled water, deionized water, tap water, fresh water from surface or subsurface sources, production water, formation water, natural and synthetic brines, brackish water, natural and synthetic sea water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the formation of an omniphobic fluorochemical barrier.

In one or more particular embodiments, an acid may be present in the treatment composition. The acid may include an inorganic acid, an organic acid, or both. The inorganic acid may include, but is not limited to, hydrochloric acid, nitric acid, hydrofluoric acid, hydrobromic acid, perchloric acid, fluoroboric acid, or derivatives, and mixtures thereof. The organic acid may include, but is not limited to, methanesulfonic acid, formic acid, acetic acid, citric acid, lactic acid, sulfamic acid, chloroacetic acid, or derivatives, and mixtures thereof. In one or more particular embodiments, the acid may be selected from the group consisting of hydrochloric acid, methanesulfonic acid, other organic acids, or combinations thereof.

Acid-producing systems may include, but are not limited to, esters, nitriles, lactones, anhydrides, orthoesters, polyesters or polyorthoesters. The acid-producing systems may include esters of short chain carboxylic acids, including, but not limited to, acetic and formic acid, and esters of hydroxycarboxylic acids, including, but not limited to, glycolic and lactic acid. These acid-producing systems may provide the corresponding acids when hydrolyzed in the presence of water.

The acid may be present in in the treatment composition in an amount having a lower limit of one of 1 wt %, 2.5 wt %, 5 wt %, 7.5 wt %, 10 wt %, 15 wt %, 20 wt %, 25 wt %, 30 wt %, 35 wt %, 40 wt %, 45 wt %, 50, and 60 wt % wt % and an upper limit of one of 10 wt %, 15 wt %, 17.5 wt %, 20 wt %, 25 wt %, 30 wt %, 35 wt %, 50 wt %, 60 wt % and 70 wt %, where any lower limit may be paired with any mathematically compatible upper limit. In one or more particular embodiments, the acid may be present in the treatment composition at a concentration in a range of from about 5 wt % to about 35 wt %, such as from about 7 wt % to about 32 wt %, from about 10 wt % to about 30 wt %, and from about 15 wt % to about 28 wt %, based on the weight of the treatment composition.

The formation treatment composition described in one or more embodiments of the present disclosure may optionally include one or more additives, for example, to improve the compatibility of the fluids described in this application with other fluids (for instance, formation fluids) that may be present in the well bore. Suitable additives may be used in liquid or powder form. Examples of such additional additives include, but are not limited to, pH-adjusting agents, pH-buffers, oxidizing agents, enzymes, lost circulation materials, scale inhibitors, surfactants, clay stabilizers, corrosion inhibitors, paraffin inhibitors, asphaltene inhibitors, penetrating agents, clay control additives, iron control additives, reducers, oxygen scavengers, sulfide scavengers, emulsifiers, foamers, gases, derivatives thereof, and combinations thereof.

Where used, additives are present in the fluids in an amount sufficient to prevent incompatibility with formation fluids or well bore fluids. In some embodiments, additives may be in a range of from about 0.01 vol % to about 10 vol % (volume percentage) of the formation treatment composition. In some embodiments, where powdered additives are used, the additives may be present in an amount in the range of from about 0.001 wt % to about 10 wt % of the total formation treatment composition. Examples of surfactants may include LOSURF259™ nonionic non-emulsifier, LOSURF300™ nonionic surfactant, LOSURF-357™ nonionic surfactant, LOSURF-400™ surfactant, and NEA-96M™ Surfactant.

In some embodiments, the formation treatment composition may optionally include a foamer. Examples of foamers include, but are not limited to, surfactants, for example, water-soluble, nonionic, anionic, cationic, and amphoteric surfactants; carbohydrates, for example, polysaccharides, cellulosic derivatives, guar, guar derivatives, xanthan, carrageenan, starch polymers, gums, polyacrylamides, polyacrylates, betaine-based surfactants, viscoelastic surfactants, natural and synthetic clays; polymeric surfactants, for example, partially hydrolyzed polyvinyl acetate; partially hydrolyzed modified polyvinyl acetate; block or copolymers of polyethane, polypropane, polybutane and polypentane; proteins; partially hydrolyzed polyvinyl acetate, polyacrylate, and derivatives of polyacrylates; polyvinyl pyrrolidone and derivatives thereof; $N_2$; CO; $CO_2$; air; and natural gas; and combinations thereof.

In some embodiments, mutual solvents may be employed. Mutual solvents may help keep other additives in solution. Suitable mutual solvents may include, but are not limited to, Halliburton's MUSOL® Mutual Solvent, MUSOL® A Mutual Solvent, MUSOL® E Mutual Solvent, ethylene glycol monobutyl ether, propylene glycol monobutyl ether, water, methanol, isopropyl alcohol, alcohol ethers, aromatic solvents, other hydrocarbons, mineral oils, paraffins, derivatives thereof, and combinations thereof. Other suitable solvents may also be used. If used, the mutual solvent may be included in a range of from about 1 vol % to about 20 vol %, and in certain embodiments in a range of from about 5 vol % to about 10 vol % based on the of the total volume of the formation treatment composition.

In some embodiments, the formation treatment composition may optionally include one or more viscosifying agents. In some embodiments, the formation treatment composition may be viscosified by a polymer system, for instance, a cross-linked polymer system, where the crosslinker comprises zirconium or ferric metal clusters.

In some embodiments, the formation treatment composition may optionally include an emulsion. The emulsion may include nonionic surfactants, such as sorbitan esters, AF-61™ Emulsifer, and AF-70™ Emulsifier (Halliburton Energy Services, Oklahoma). In some embodiments, a surfactant is an oil external surfactant, which may include AF-61™ Emulsifer and AF-70™ Emulsifier. For water external emulsions, exemplary surfactants include SEM-7™ Emulsifier, WS-36™ Dispersant, and WS-44™ Emulsifier. Optional surfactants may be included in an amount ranging from about 0.1 vol % (volume percent) to about 3 vol % based on the total volume of solution is sufficient. In some embodiments, the emulsion can be mixed at the surface of the reservoir, or prior to reservoir treatment and then pumped downhole as described above. In some embodiments, the components can be pumped downhole and then mixed in coiled tubing, bullheading, or production tubing as described above.

In some embodiments, the formation treatment composition may optionally include one or more gelling agents. Any gelling agent suitable for use in subterranean applications may be used in the formation treatment composition of the present disclosure, including, but not limited to, natural biopolymers, synthetic polymers, cross-linked gelling agents, and viscoelastic surfactants. Guar and xanthan are examples of suitable gelling agents. A variety of gelling agents may be used, including hydratable polymers that contain one or more functional groups such as hydroxyl, carboxyl, sulfate, sulfonate, amino or amide groups. Suitable gelling agents may comprise polysaccharides, biopolymers, synthetic polymers, and a combination thereof. Examples of suitable polymers include, but are not limited to, guar gum and derivatives thereof, such as hydroxypropyl guar and carboxymethylhydroxypropyl guar; cellulose derivatives, such as hydroxyethyl cellulose; locust bean gum; tara; konjak; tamarind; starch; cellulose; karaya; diutan; scleroglucan; wellan; gellan; xanthan; tragacanth; carrageenan; derivatives thereof; and combinations thereof of one or more of such polymers. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents may include polymers and copolymers having various ratios of acrylic, acrylamide, acrylamidomethylpropane sulfonic acid, quaternized dimethylaminoethylacrylate, and quaternized dimethylaminoethylmethacrylate.

In other embodiments, the gelling agent molecule may be depolymerized. The term "depolymerized" generally refers to a decrease in the molecular weight of the gelling agent molecule. The gelling agent may include oxidizers, encapsulated oxidizers, or enzyme breakers, such as sodium persulfate, potassium persulfate, ammonium persulfate, magnesium peroxide, sodium chlorite, sodium bromate, alpha and beta amylases, amyloglucosidase, invertase, maltase, cellulose, hemicellulose, and the like. If used, a gelling agent may be present in the acid-generating fluids of the formation treatment composition in an amount in the range of from about 0.01 wt % to about 5 wt % of the base fluid.

To combat possible perceived problems associated with polymeric gelling agents, some surfactants have been used as gelling agents. It is well understood that when mixed with a fluid in a concentration greater than the critical micelle concentration the molecules (or ions) of surfactants may associate to form micelles. These micelles may function, among other purposes, to stabilize emulsions, break emulsions, stabilize foam, change the wettability of a surface, solubilize certain materials, and reduce surface tension. When used as a gelling agent, the molecules (or ions) of the surfactants used associate to form micelles of a certain micellar structure (e.g., rodlike, wormlike, or vesicles which are referred to here as "viscosifying micelles") that, under certain conditions (e.g., concentration or ionic strength of the fluid) are capable of, inter alia, imparting increased viscosity to a particular fluid and forming a gel. Certain viscosifying micelles may impart increased viscosity to a fluid such that the fluid exhibits viscoelastic behavior (e.g., shear thinning properties) due, at least in part, to the association of the surfactant molecules. Moreover, because the viscosifying micelles may be sensitive to pH and hydrocarbons, the viscosity of these viscoelastic surfactant fluids may be reduced after introduction into the subterranean formation without the need for certain types of gel breakers (e.g., oxidizers).

A particular surfactant that may be useful is a methyl ester sulfonate (MES) surfactant. Suitable MES surfactants include, but are not limited to, methyl ester sulfonate surfactants having the formula $RCH(SO_3M)CO_2CH_3$, where R is an alkyl chain of about $C_{10}$-$C_{30}$. This may allow a substantial portion of the viscoelastic surfactant fluids to be produced back from the formation without the need for expensive remedial treatments. If used, these surfactants may be used in an amount ranging from about 0.1 gpt to about 100 gpt of the formation treatment composition.

While optional, at least a portion of the gelling agent included in the formation treatment composition may be cross linked by a reaction comprising a cross linking agent, for example, to further increase viscosity. Cross-linking agents typically comprise at least one metal ion that is capable of cross-linking gelling agent molecules. Various cross-linking agents may be suitable; formation treatment compositions are not limited by ligand choice on the cross-linking agent. Examples of suitable cross linking agents may include zirconium compounds (such as, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, titanium lactate, titanium maleate, titanium citrate, titanium ammonium lactate, titanium triethanolamine, and titanium acetylacetonate); aluminum compounds (such as, aluminum lactate or aluminum citrate); borate compounds (such as, sodium tetraborate, boric acid, disodium octaborate tetrahydrate, sodium diborate, ulexite, and colemanite); antimony compounds; chromium compounds; iron compounds; copper compounds; zinc compounds; or a combination thereof. An example of a suitable commercially available zirconium-based cross-linking agent is CL24™ cross-linker from Halliburton Energy Services, Inc., Duncan, Oklahoma. An example of a suitable commercially available titanium-based cross-linking agent is CL39™ cross linker from Halliburton Energy Services, Inc., Duncan Oklahoma. An example of a suitable borate-based cross-linking agent is commercially available as CL-22™ delayed borate cross linker from Halliburton Energy Services, Inc., Duncan, Oklahoma. Divalent ions also may be used, for example, calcium chloride and magnesium oxide. An example of a suitable divalent ion cross linking agent is commercially available as CL30™ from Halliburton Energy Services, Inc., Duncan, Oklahoma.

Another example of a suitable cross-linking agent is CL-15, from Halliburton Energy Services, Inc., Duncan Oklahoma. Where present, the cross-linking agent generally may be included in the treatment composition in an amount sufficient, among other things, to provide the desired degree of cross linking. In some embodiments, the cross-linking agent may be present in the formation treatment composition in an amount in the range of from about 0.01 wt % to about 5 wt % of the total weight of the formation treatment composition. Buffering compounds may be used if desired, for example, to delay or control the cross-linking reaction. These may include, but are not limited to, glycolic acid, carbonates, bicarbonates, acetates, and phosphates. In some embodiments, if a gelling agent (for instance, a cross linked gelling agent) is used, then a suitable breaker may be advisable depending on the gelling agent and its interaction with the acid-generating compound, the generated acid, and the well bore conditions. A breaker may be advisable to ultimately reduce the viscosity of the formation treatment composition. Any breaker suitable for the subterranean formation and the gelling agent may be used. The amount of a breaker to include will depend, inter alia, on the amount of gelling agent present in the formation treatment composition. Other considerations regarding the breaker are known to one skilled in the art.

In one or more embodiments, the formation treatment composition may optionally include one or more bactericides. Bactericides protect both the subterranean formation as well as the fluid from attack by bacteria. Such attacks may be problematic because they may reduce the viscosity of the fluid, resulting in poorer performance, for example. Bacteria may also cause plugging by bacterial slime production and can turn the oil in the formation sour. Any bactericides known in the art are suitable. An artisan of ordinary skill with the benefit of this disclosure will be able to identify a suitable bactericide and the proper concentration of such bactericide for a given application. Where used, such bactericides may be present in an amount sufficient to destroy all bacteria that may be present. Examples of suitable bactericides include but are not limited to 2,2-dibromo-3-nitrilopropionamide and 2-bromo-2-nitro-1,3-propanediol. In one embodiment, the bactericides may be present in the formation treatment composition in an amount in the range of from about 0.001 wt % to about 0.003 wt % based on the total weight of the formation treatment composition. Another example of a suitable bactericide is a solution of sodium hypochlorite. In certain embodiments, such bactericides may be present in the formation treatment composition in an amount in the range of from about 0.01 vol % to about 0.1 vol % based on the total volume of the formation treatment composition.

Method of Making a Treatment Composition

One or more embodiments of the present disclosure relate to a method for preparing a formation treatment composition that may include an omniphobic fluorochemical, an acid, or combinations thereof. The method includes preparing the formation treatment composition by mixing the omniphobic fluorochemical with an acid in a solution and introducing the formation treatment composition into a wellbore such that that the formation treatment composition contacts the formation. In some embodiments, the omniphobic fluorochemical and the acid may each be in an aqueous solution and combined prior to a formation treatment.

In some embodiments, the omniphobic fluorochemical and an acid may be added, separately or together, to an aqueous medium of the formation treatment composition so that the omniphobic fluorochemical is in an amount substoichiometric compared to the acid. In some embodiments, the omniphobic fluorochemical may be added with an acidic aqueous solution in the formation treatment composition so that the omniphobic fluorochemical is present in the formation treatment composition at a concentration of less than 100 gpt (gallons per 1000 gallons). In some embodiments, the formation treatment composition may be added to formations having fractures extending from tens to several hundreds of feet.

In one or more particular embodiments, the treatment may include a pre-flush fluid prior to introducing the treatment composition. The pre-flush fluid may be prepared by adding an omniphobic fluorochemical to a solvent. The treatment composition may include an acidic fluid prepared by dissolving an acid in an aqueous fluid. The pre-flush fluid of one or more embodiments may include an omniphobic fluorochemical in a hydrocarbon solvent. In one or more particular embodiments, the pre-flush fluid may include an aqueous solution of the omniphobic fluorochemical. The omniphobic fluorochemical of such embodiments may be water-soluble.

Method of Attenuating Acid Reactivity

One or more embodiments of the present disclosure relate to a method for attenuating the reactivity of acid with a formation using a formation treatment composition which includes an omniphobic fluorochemical, an acid, or a combination thereof. As described above, a mixture including the aqueous solution of the acid and the aqueous solution of the omniphobic fluorochemical forms the formation treatment composition.

The method of attenuating acid reactivity with a formation treatment composition of one or more embodiments includes introducing the formation treatment composition into a wellbore such that that the formation treatment composition contacts a rock surface of the formation. In one or more particular embodiments, the formation (or "rock" or "rock matrix") includes a carbonate formation, such as a carbonate rock. In such embodiments, a carbonate rock may include limestone (or calcium carbonate, $CaCO_3$), dolomite (calcium magnesium carbonate, $CaMg(CO_3)_2$), or both. Embodiments that include dolomite and limestone in the carbonate rock may be in any ratio.

In some embodiments, the step of contacting the formation includes introducing the formation treatment composition into the formation via coiled tubing or bullheading in a production tube. In one or more embodiments, a method of attenuating acid reactivity may include introducing an aqueous solution of the omniphobic fluorochemical solution and an aqueous solution of the acid into the formation in separate stages, optionally via the same or different tubings, such as the same or different coiled tubings, and allowing the aqueous fluids to mix within the formation to form the formation treatment composition. The two aqueous solutions are mixed in situ within the tubing, within the formation, or within the area around the wellbore.

The omniphobic fluorochemical may include a hydrophilic head-group and a hydrophobic tail-group as described above. Upon contact with the formation, the omniphobic fluorochemical preferentially adsorbs onto the formation surface, creating a temporary barrier between the acid of the formation treatment composition and the formation surface, controlling acid diffusion to the formation surface, and hence, retarding the acid reactivity. The omniphobic fluorochemical may adhere to the formation surface via surface adsorption resulting from the coordination of the hydrophilic head groups with the formation surface. The tail groups are therefore directed outward from the formation surface. The tail groups induce a hydrophobic or omniphobic character in the vicinity of the formation surface. This hydrophobic or omniphobic character hinders access of the acidic component of the formation treatment composition to the formation surface. In some embodiments, the omniphobic fluorochemical may generate foam, which may be responsible for the attenuation behavior as the presence of foam in the vicinity of the formation surface will provide a temporary barrier between the acid and the rock matrix.

The acidic component of the formation treatment composition may flow deeper into the formation, where it may encounter a portion of formation surface not hindered by the barrier created by the omniphobic fluorochemical contacting the formation surface. The acid may then interact with the deeper formation surface, including reacting with it at an increased penetration depth. The omniphobic fluorochemical barrier of one or more embodiments may mitigate, such that it attenuates a reaction between the acid of formation treatment composition and the rock surface. In such embodiments, the omniphobic fluorochemical may provide partial attenuation of the reaction between the formation surface and the acid.

In one or more particular embodiments, a method of attenuating acid reactivity may include introducing a pre-flush fluid. The formation treatment of some embodiments may include a pre-flush fluid. The pre-flush fluid may include an omniphobic fluorochemical and a solvent. In such embodiments, an acidic fluid including an acid and a second solvent may then be employed for formation treatment.

The solvent of the pre-flush fluid of one or more embodiments may be a hydrocarbon solvent, an alcohol-based solvent, an aqueous fluid, or combinations thereof. In one or more particular embodiments, the alcohol-based solvent may be methanol and/or ethanol. The aqueous fluid may include a water-based fluid. In some embodiments, the aqueous fluid may be a gelled fluid, a crosslinked fluid, an emulsified fluid, a viscoelastic (VES) fluid system, or combinations thereof. In some embodiments, the introducing the pre-flush fluid may be performed prior to introducing an acidic fluid, such that the pre-flush fluid contacts a formation surface for a period of time.

In some embodiments, the pre-flush fluid is in contact with the formation for a time ranging from about 1 hour to about 12 hours. The formation treatment composition or the pre-flush fluid may be in contact with a formation for a period of time with a lower limit of one of 1, 2, 2.5, 4, 5, 7.5, 8, and 10 hours, and an upper limit of one of 2, 2.5, 3, 4, 5, 6, 7, 8, 10, 11, and 12 hours, where any lower limit may be paired with any mathematically compatible upper limit.

The step of contacting the formation for a period of time with the pre-flush fluid may further include contacting the omniphobic fluorochemical of the formation treatment composition with the rock of the formation, or contacting the omniphobic fluorochemical of the pre-flush fluid with the rock of the formation. In such embodiments, the contacting the rock of the formation further includes creating an omniphobic fluorochemical barrier on the rock surface.

An acidic fluid as described above, which includes an acid in an aqueous fluid, is then injected into the reservoir. As described above, the acidic fluid may flow deeper into the formation to encounter a portion of formation surface not hindered by the barrier created by the omniphobic fluorochemical contacting the formation surface. The acid of the aqueous fluid may then interact with the deeper formation surface. In such embodiments, the omniphobic fluorochemical barrier mitigates a reaction between the acid of the second fluid and the rock surface, thereby attenuating a reaction between the rock and the acid.

In some embodiments, a method of attenuating acid reactivity may include introducing a formation treatment composition prior to introducing an acidic solution. In such embodiments, the steps of injecting the formation treatment composition prior to injecting the acidic solution may optionally be repeated.

The acidic fluid of one or more embodiments may be introduced in coordination or combination with supercritical carbon dioxide or nitrogen. In such embodiments, the introduction of the acidic fluid in combination with nitrogen may include the omniphobic fluorochemical of one or more embodiments, thereby forming an energized treatment fluid.

The omniphobic fluorochemical barrier of one or more embodiments may alter the wettability of the rock surface. In such embodiments, the omnipobic fluorochemical barrier may change the wettability of the rock surface to repel aqueous solutions and hydrocarbon solutions. In one or more embodiments, creating the omniphobic fluorochemical barrier on the rock surface includes increasing a contact angle between the injected formation treatment composition and the rock surface, thereby providing a decreased liquid wetting of the rock surface.

The wettability of the barrier on the rock surface may be measured by contact angle measurements. The contact angle is the angle formed by a liquid at the three-phase boundary where a liquid, a gas, and solid intersect. In one or more particular embodiments, the omniphobic fluorochemical barrier may have a contact angle between the injected formation treatment composition, or the injected pre-flush fluid, and the rock surface with a lower limit of 70 degrees) (°, 80°, 90°, 100°, 110°, 115°, 120°, 130°, 140°, 150°, 155°, and 165°, and an upper limit of 110°, 120°, 130°, 145°, 150°, 155°, 160°, 165°, 170°, and 180° where any lower limit may be paired with any mathematically compatible upper limit. In such embodiments, the omniphobic fluorochemical barrier may have a contact angle of at least 110° or at least 120°.

The method of attenuating acid reactivity of one or more embodiments may further include producing hydrocarbons from the carbonate formation. The formation (e.g., a carbonate formation or a carbonate rock) may include highly conductive channel networks formed by the retarded action of the acid solution within the formation.

The method of attenuating acid reactivity of one or more particular embodiments described above may be performed repeatedly. In such embodiments, the method of attenuating acid reactivity may include injecting the pre-flush fluid, the acidic fluid, the formation treatment composition, or combinations thereof. In such embodiments, the pre-flush fluid, the acidic fluid, the formation treatment composition, or combinations thereof may be injected in a pulse mode. In one or more particular embodiments, the formation treatment composition including the acid and the omniphobic fluorochemical may be injected followed by an acidic solution.

EXAMPLES

The following examples are merely illustrative and should not be interpreted as limiting the scope of the present disclosure.

Fluorinated chemicals employed in the following studies were WS1200® (3M) and NW100® (10 vol % in water, Verdechem). Fluorosilanes including aqueous Dynasylan® F 8815, Dynasylan® F 8263 in propanol solvent, and Dynasylan® F 9896 in ethanol solvent were obtained from Evonik Industries (New Jersey). American Chemical Society (ACS) grad hydrochloric acid (HCl) was obtained from VWR. Deionized water was obtained from a water purification system with an 18.2 mΩ/cm (milliOhms per centimeter) resistivity.

Example 1. Contact Angle Measurement Studies Between Carbonate and Water

NW100® was diluted with water to obtain final concentrations of 50 gpt, 40 gpt, 30 gpt, 20, gpt, 10 gpt, 5 gpt, and 2 gpt. The contact angle of water of an untreated and treated marble surface was measured for different solutions of NW100®. A ramé-hart Contact Angle Goniometer for contact angle measurements. In such measurements, a contact angle can be measured by producing a drop of liquid on a solid surface. The angle formed between the solid/liquid interface and the liquid/vapor interface is referred to as the contact angle. The most common method for measurement involves evaluating the profile of the drop of liquid and two-dimensionally measuring the angle formed between the solid and the drop of liquid profile with the vertex at the three-phase line.

The different solutions were formulated with increasing concentrations of NW100® from 0 to 50 gpt. FIG. 1 is a graph demonstrating results obtained for water contact angle measurements at varying concentrations of NW100 ®. In FIG. 1, it is noted that even at relatively low concentrations, such as 2 gpt, the NW100® was altered the contact angle from 40 degrees (water wet) to 120 degrees (non-water wet).

Example 2. Core-Plug Dissolution Experiments

The objective of this study was to access the dissolution profile for a series of acid packages under analogous testing conditions. The parameters included ambient pressure and temperature, a standard fluid volume of 100 mL (milliliters) and an exposure time of 5 minutes. The acid formulations were prepared by adding up to 20 gpt of select fluorinated surfactants to HCl (up to 28 wt %). The fluorinated surfactants included in these studies were WS1200® (3M) and NW100® (Verdechem).

In a typical experiment, the following steps were performed. Homogenous Indiana limestone core samples having a permeability between 4-8 mD (milliDarcy) were cut to diameter and length of 1.5 inches diameter by 0.5 inch length. One core sample was used for each individual test. Cores were then dried in an oven at 248° F. overnight. Each of the dried cores were then saturated in deionized water under vacuum for 12 to 24 hours. The dry and saturated weight for the pre-treated cores were recorded and porosity was calculated. Acidified solutions were prepared according to formulation details listed in Table 1.

Each core sample was subjected to deionized water (DI $H_2O$) saturation. Each saturated core was then transferred to a 250 mL (milliliter) beaker containing 100 mL of each acid formulation. For each experiment, the core sample was placed vertically in the solution for a duration of 5 minutes under ambient temperature and pressure conditions. The sample was promptly removed and submerged in DI-$H_2O$ to stop the reaction. Digital photos were taken of the cores before and after acidizing.

With respect to Formulation 3, a dry core sample was transferred to beaker containing NW100® (2 gpt in water) and allowed to pre-soak for 24 h. The sample was then removed and placed directly into a 250 mL beaker containing 100 mL of Formulation 3. As mentioned above, the core sample was placed vertically in the solution for a duration of 5 minutes under ambient temperature and pressure conditions. The sample was promptly removed and submerged in DI $H_2O$ to stop the reaction. Digital photos were taken of the cores before and after acidizing.

The weight of each of the saturated acidized core samples was measured for both the dry and saturated core sample. The percent of the weight loss for each core was calculated and compared. Additionally, for each test, the amount of dissolved calcite ($CaCO_3$) was calculated using Inductively Coupled Plasma Optical Emission Spectrometry (ICP-OES) measurements by determining the calcium concentration detected from an aliquot of the reaction.

TABLE 1

Calculated weight loss of Indiana limestone core samples post-acidizing.

| Formulation | HCl (wt %) | Additive Name | Additive Concentration (gpt) | Calcite Dissolved (%) |
|---|---|---|---|---|
| 1 | 15 | N/A | 0 | 38.7 |
| 2 | 28 | N/A | 0 | 57 |
| 3 | 15 | NW100 ® (sample pre-coated) | 2 | 5.81 |
| 4 | 15 | WS1200 ® | 20 | 3.6 |
| 5 | 15 | WS1200 ® | 60 | 3.1 |
| 6 | 15 | WS1200 ® | 2.5 | 9.9 |
| 7 | 15 | WS1200 ® | 10 | 4.2 |
| 8 | 28 | WS1200 ® | 2.5 | 15.7 |
| 9 | 28 | WS1200 ® | 10 | 8.1 |

The calculated weight loss of Indiana limestone core samples, post-acidizing, for the acid formulations containing 15 and 28 wt % HCl in the absence of the fluorochemicals NW100® and WS1200® indicated relatively high percentages of calcite dissolved. In contrast, the presence of the noted fluorochemical additive shows that the substantial decrease in the dissolution of rock in acid. For example, formulations 3-7 and formulation 9 demonstrate the suitability of the fluorochemical additives to attenuate acid reactivity. In addition, results from studies with Formulation 8 similarly indicate a notable decrease in acid reactivity with calcite with slightly elevated calcite removal percentages. This is presumably a result of the increased acid to fluorochemical ratio of the formulation.

Additional core dissolution studies were performed with fluorochemical additives 8815, 8263, and 9896 each in water with 15 wt % HCl. Indiana limestone core samples and dissolution studies were prepared according to the procedures described above. Results of these studies are provided in Table 2.

TABLE 2

Calculated weight loss of Indiana limestone core samples post-acidizing.

| HCl (wt %) | Additive Name | Additive Concentration (Vol %) | Calcite Dissolved (%) |
|---|---|---|---|
| 15 | No Additive | 0 | 43 |
| 15 | Dynasylan ® 8815 in Water | 10 | 37.3 |
| 15 | Dynasylan ® 8263 in Propanol | 10 | 35.9 |
| 15 | Dynasylan ® 9896 in Ethanol | 10 | 47.4 |

Results from Table 2 indicate the low acid attenuating functionality of fluorochemical additives Dynasylan® 8815, Dynasylan® 8263, Dynasylan® 9896. In contrast to results highlighted in Table 1, results of Table 2 indicate a low propensity to prevent calcite dissolution. Notably, Dynasylan® 8815, Dynasylan® 8263, and Dynasylan® 9896 are fluorinated silanes. In effect, comparative results of Table 1 and Table 2 bring attention to the fact that not all fluorinated chemicals can be used to attenuate acidic reactivity of carbonate rock.

Example 3. High Temperature/High Pressure Coreflow Studies

Core preparation procedures were performed as follows. Indiana limestone calcite core samples having a porosity ranging from 14.3 to 16.3 vol % (volume percent) obtained from a local supplier in Texas and were selected for this study. The absolute permeability for each deionized water saturated core sample was measured in a horizontal fashion using a high temperature, high pressure (HT/HP) coreflood apparatus equipped with a 12 inch coreholder. The permeability of core samples was calculated by flowing deionized water through the core sample at various flow rates, such as ranging flow rates from 0.5 to 4 $cm^3$/min (centimeters cubed per minute) until the flow stabilized. For each flow rate, the average differential pressure across the core (DP) was recorded and applied to Darcy's equation to determine the initial permeability.

Coreflow experiments are commonly performed in the oil and gas industry to evaluate and benchmark the performance of an assortment of oilfield reservoir stimulation fluids, including acid systems. Accordingly, a linear coreflow experiment was performed to validate that acid attenuation behavior observed under static conditions, ambient temperature, and ambient pressure applied to reservoir conditions. In this regard, conditions were 300° F. and 3000 psi. Formulations containing 28 wt. % HCl and 10 gpt of WS1200® were selected as proof-of-concept for this study.

Figure 2:
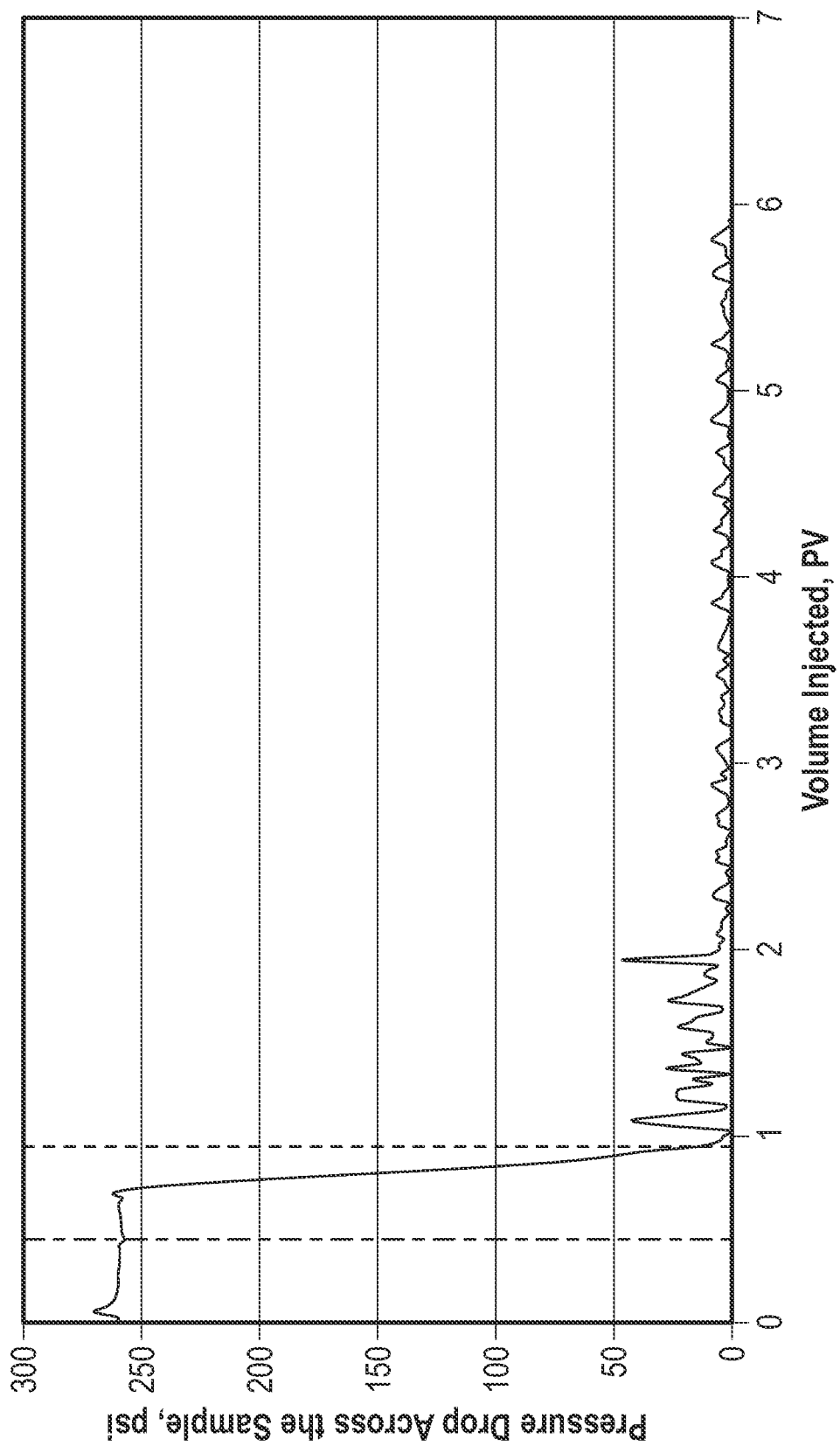
FIG. 2 is a graph of pressure measurement results across a core sample measured during acid injection in accordance with one or more embodiments.

For acidizing applications, the volume of acid required to dissolve a path in the core plug, i.e. from the inlet to the outlet of the core sample, is one indication of success at the lab-scale. This value is commonly referred to as pore volume to breakthrough (PVBT). Acid systems having higher acid-rock reactivity will be associated with higher PVBT values under analogous testing conditions and vice versa. Thus, lower PVBT values are desired because the expectation is that at the field-scale the result will correlate with increased stimulation of the treated zone. This result is driven by the fact that live acid can penetrate deeper into the reservoir, and thereby, increase the relative permeability for oil and gas to be produced. As shown in FIG. 2, the measured pressure drop across the core sample during acid injection indicates desired acid breakthrough.

Guided by the promising attenuation results obtained under ambient conditions shown in FIG. 2, it was anticipated that the instant formulation tested would require less acid to achieve breakthrough as compared to 28 wt % HCl in the absence of surfactant. Table 3 provides a summary of coreflood data collected for 12-inch outcrop Indiana limestone core samples treated with different acid systems at a temperature, pressure and flow rate of 300° F., 3000 psi, and 5 $cm^3$/min, respectively.

TABLE 3

Summary of coreflood data collected for 12-inch outcrop Indiana limestone core samples.

| Fluid ID | $PV_{BT}$ | Core Length (inch) | Core Diameter (inch) |
|---|---|---|---|
| 28 wt % HCl + 10 gpt WS 1200 ® | 0.25 | 12 | 1.5 |
| 28 wt % HCl | 1.1 | 12 | 1.5 |
| 26 wt % Emulsified Acid | 0.55 | 12 | 1.5 |

As shown in Table 3, the acid volume needed to achieve breakthrough was reduced by 75% from the addition of WS1200® to an acidic solution including 28 wt % HCl. Even when compared to 26 wt. % HCl of an emulsified acid, the system with fluorochemical WS1200 demonstrated around 50% reduction in the volume of acid need to achieve breakthrough. In effect, results of Table 3 indicate a 100% improvement in the acid penetration rate when using the HCl/WS1200® formulation.

The results from these studies detailed above serve as proof-of-concept to the invention and provide insights as to the role of additive selection on attenuating the acid-rock reactivity behavior. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A formation treatment composition comprising:
   an aqueous fluid;
   an acid; and
   at least one omniphobic fluorochemical configured to form an omniphobic fluorochemical barrier on a rock matrix, and wherein the omniphobic fluorochemical barrier is configured to mitigate a reaction between the rock matrix and the acid,
   wherein the formation treatment composition comprises the acid in a range from 10 wt % to 70 wt % based on the total weight of the formation treatment composition,
   wherein the acid is selected from the group consisting of hydrochloric acid, methanesulfonic acid, and combinations thereof, and
   wherein the at least one omniphobic fluorochemical is water soluble and is selected from the group consisting of a nonionic acrylic fluorinated copolymer, a nonionic fluorinated surfactant, partially fluorinated acrylic copolymer, a nonionic fluorinated methacrylate polymer, an anionic phosphate fluorinated surfactant, an anionic sulfate fluorinated surfactant, and combinations thereof.

2. The formation treatment composition of claim 1, comprising from 0.1 vol % to 10 vol % of the at least one omniphobic fluorochemical.

3. The formation treatment composition of claim 1, wherein the at least one omniphobic fluorochemical is selected from the group consisting of a fluorinated surfactant, a fluorinated polymer, and combinations thereof.

4. The formation treatment composition of claim 1, wherein the aqueous fluid is selected from the group consisting of a gelled fluid, a crosslinked fluid, an emulsified fluid, a viscoelastic fluid, and combinations thereof.

5. A method of attenuating acid reactivity of a formation rock,
   the method comprising:
   injecting a formation treatment composition into a reservoir, wherein the formation treatment composition comprises a solution of a fluid comprising, at least one omniphobic fluorochemical and an acid,
   wherein the at least one omniphobic fluorochemical is water soluble and is selected from the group consisting of a nonionic acrylic fluorinated copolymer, a nonionic fluorinated surfactant, partially fluorinated acrylic copolymer, a nonionic fluorinated methacrylate polymer, an anionic phosphate fluorinated surfactant, an anionic sulfate fluorinated surfactant, and combinations thereof,
   wherein the acid is selected from the group consisting of hydrochloric acid, methanesulfonic acid, and combinations thereof, and
   wherein the formation treatment composition comprises the acid in a range from 10 wt % to 70 wt % based on the total weight of the formation treatment composition;
   contacting the omniphobic fluorochemical of the formation treatment composition with the rock, thereby creating an omniphobic fluorochemical barrier on a surface of the formation rock; and
   mitigating a reaction between the acid of the formation treatment composition and the rock surface, thereby attenuating a reaction between the rock and the acid.

6. The method of claim 5, wherein the reservoir comprises a carbonate reservoir, a carbonate-damaged area of a sandstone reservoir, or a carbonate formation of a rock matrix.

7. The method of claim 5, wherein the creating the omniphobic fluorochemical barrier on the rock surface further comprises increasing a contact angle between the injected formation treatment composition and the rock surface, thereby providing a decreased liquid wetting of the rock surface.

8. The method of claim 7, wherein the creating the omniphobic fluorochemical barrier on the rock surface further comprises providing a contact angle of from 70° to 160° between the injected formation treatment composition and the rock surface.

9. A method of attenuating acid reactivity of a formation rock, the method comprising:
   injecting a pre-flush fluid into a reservoir, wherein the pre-flush fluid comprises a solution comprising an omniphobic fluorochemical, wherein the at least one omniphobic fluorochemical is water soluble and is selected from the group consisting of a nonionic acrylic fluorinated copolymer, a nonionic fluorinated surfactant, partially fluorinated acrylic copolymer, a nonionic fluorinated methacrylate polymer, an anionic phosphate fluorinated surfactant, an anionic sulfate fluorinated surfactant, and combinations thereof;

contacting the omniphobic fluorochemical of the pre-flush fluid with a rock surface of the formation, thereby creating an omniphobic fluorochemical barrier on the rock surface with the omniphobic fluorochemical of the pre-flush fluid;

injecting an acidic fluid into the reservoir, wherein the acidic fluid comprises an acid in an aqueous fluid, wherein the acid is selected from the group consisting of hydrochloric acid, methanesulfonic acid, and combinations thereof, and wherein the acidic fluid comprises the acid in a range from 10 wt % to 70 wt % based on the total weight of the acidic fluid; and mitigating a reaction between the acid of the acidic fluid and the rock surface, thereby attenuating a reaction between the rock and the acid.

10. The method of claim 9, wherein the omniphobic fluorochemical is selected from the group consisting of a fluorinated surfactant, a fluorinated polymer, and combinations thereof.

11. The method of claim 9, wherein the formation rock comprises a carbonate-damaged area of a sandstone reservoir or a carbonate formation of a rock matrix.

12. The method of claim 9, wherein the creating the omniphobic fluorochemical barrier on the rock surface further comprises increasing a contact angle between the injected pre-flush fluid and the rock surface, thereby providing a decreased liquid wetting of the rock surface.

13. The method of claim 12, wherein the creating the omniphobic fluorochemical barrier on the rock surface further comprises providing a contact angle of from 70° to 160° between the injected pre-flush fluid and the rock surface.

14. The method of claim 9, wherein mitigating the reaction further comprises:
injecting a formation treatment composition;
injecting the acidic solution; and
optionally repeating the injecting the formation treatment composition followed by the acidic solution.

15. The method of claim 9, further comprising injecting the acidic fluid into the reservoir in combination with supercritical carbon dioxide or nitrogen and a fluorochemical.

* * * * *